May 16, 1950

C. R. HANNA 2,508,158

GYROSCOPICALLY CONTROLLED ELEVATOR SYSTEM

Filed Jan. 29, 1949

INVENTOR
Clinton R. Hanna.
BY C. L. Freedman
ATTORNEY

May 16, 1950  C. R. HANNA  2,508,158
GYROSCOPICALLY CONTROLLED ELEVATOR SYSTEM
Filed Jan. 29, 1949  2 Sheets-Sheet 2
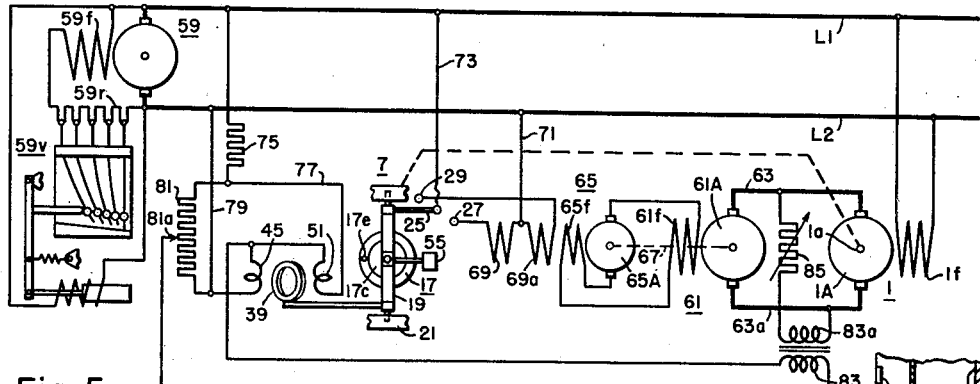
Fig. 5.
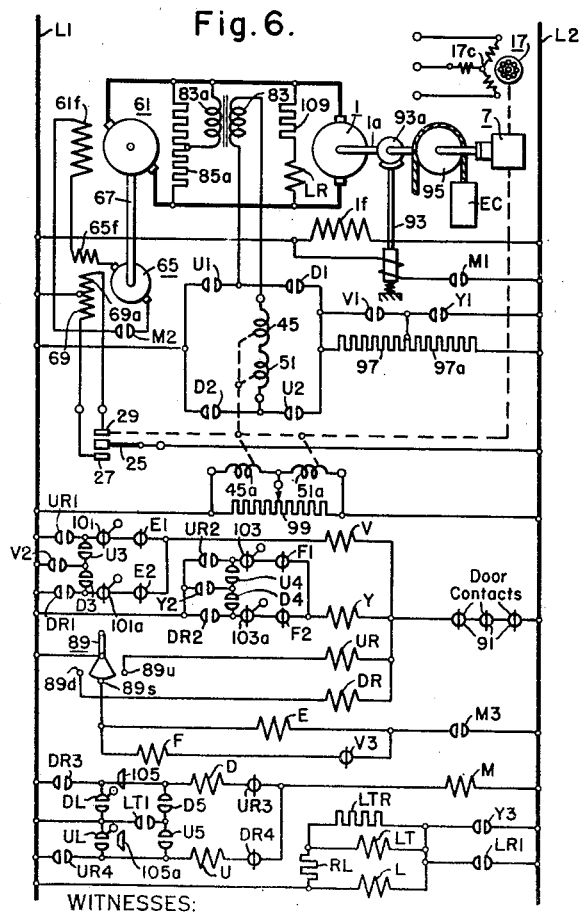
Fig. 6.
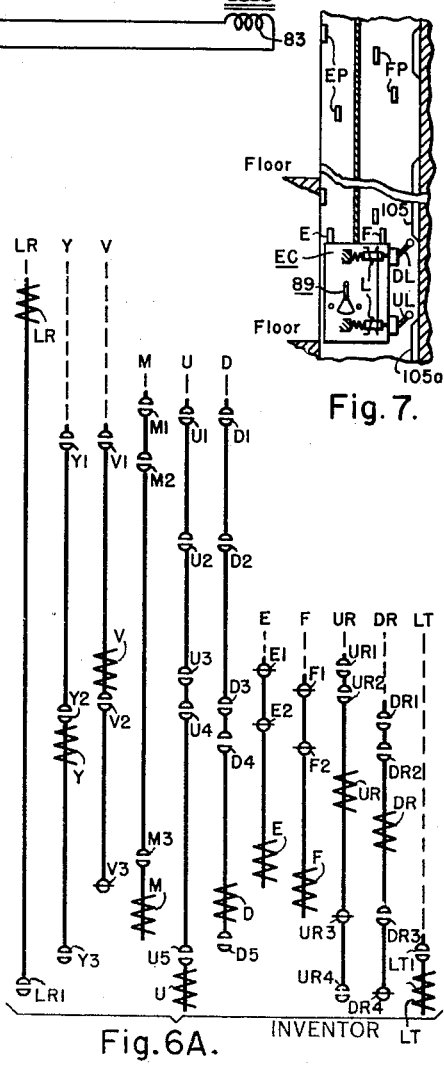
Fig. 7.
Fig. 6A.
WITNESSES:
Robert A Baird
Wm. C. Groome
INVENTOR
Clinton R. Hanna.
BY C. L. Freedman
ATTORNEY Patented May 16, 1950

2,508,158

UNITED STATES PATENT OFFICE 2,508,158

GYROSCOPICALLY CONTROLLED ELEVATOR SYSTEM

Clinton R. Hanna, Pittsburgh, Pa., assignor to Westinghouse Electric Corporation, East Pittsburgh, Pa., a corporation of Pennsylvania Application January 29, 1949, Serial No. 73,483

29 Claims. (Cl. 187—29)

This invention relates to systems for controlling motors and it has particular relation to elevator systems having adjustable speed regulators.

Speed regulating systems are employed widely for controlling the speed of motors. Inasmuch as the invention is particularly suitable for controlling the speed of motors employed for moving elevator cars, it will be discussed principally in connection with an elevator system.

A number of factors influence the selection of a speed regulating system for elevator cars. If the elevator system is of the automatic landing type, the speed regulation thereof must be sufficiently accurate to permit the elevator car to be brought to a stop accurately at a desired landing. In such a system designed for high speed operation the elevator car normally is operated at a relatively high running speed and is brought to a low landing speed as it approaches a landing at which a stop is to be made. As a specific example, the reduction in speed of the elevator car may be initiated a predetermined distance from the desired landing.

For efficient operation the reduction in speed of the elevator car as it approaches a desired landing should be as rapid as possible. However, the pattern of speed reduction must be selected to avoid discomfort to passengers carried by the elevator car.

Since accurate landing requires extremely accurate speed regulation of the elevator car at a low landing speed, the control system should have substantial sensitivity at the low speed. As a specific example, an elevator motor in a gearless elevator system may operate at a rate of the order of one revolution per minute as the elevator car nears a landing at which it is to stop. Furthermore, a control system should have a fast response to assure efficient operation of the system. This is particularly desirable for elevator systems of the leveling type.

In accordance with the invention, a gyroscope is employed for controlling the speed of an elevator car. The gyroscope may be of the rate or restrained type which is provided with an adjustable bias for the purpose of adjusting the speed of the associated elevator car.

For stable operation of the gyroscopic control of the elevator car, it is desirable that the bias of the gyroscope be controlled in accordance with the acceleration of the elevator car. To this end, a preferred embodiment of the invention contemplates the modification of the bias acting on the gyroscope in accordance with the rate of change of counterelectromotive force of the elevator motor. In the preferred embodiment of the invention, a transformer has its primary winding connected for energization in accordance with the counterelectromotive force of a direct-current elevator motor. The secondary winding of the transformer is connected to modify the bias of the gyroscope.

It is therefore an object of the invention to provide an improved gyroscopically-controlled motor system.

It is a further object of the invention to provide an elevator system wherein the speed of an elevator car is regulated by a gyroscope.

It is a further object of the invention to provide an automatic landing elevator system wherein the speed of an elevator car is varied from a running to a landing speed under the control of a restrained gyroscope.

It is an additional object of the invention to provide an elevator system wherein the speed of an elevator car is controlled by a restrained gyroscope and wherein the bias of the gyroscope is modified in accordance with the rate of change of the speed of the elevator car.

It is a still further object of the invention to provide a variable-voltage motor-control system wherein the speed of the motor is controlled by a restrained gyroscope and wherein negative bias for the gyroscope is derived from a transformer energized in accordance with the counterelectromotive force of the motor.

Other objects of the invention will be apparent from the following description taken in conjunction with the accompanying drawings, in which Figure 1 is a view in side elevation with parts broken away of a motor having a gyroscopic unit associated therewith in accordance with the invention;

Fig. 5 is a schematic view of a motor control system embodying the invention;

Fig. 6 is a schematic view of an elevator system embodying the invention, the circuits in Fig. 6 being shown in straight line form;

Fig. 6A is a key diagram showing relays and switches employed in the schematic view of Fig. 6; and Fig. 7 is a view in elevation with parts broken away showing a portion of an elevator car and hoistway suitable for the system represented by the schematic view of Fig. 6.

Figure 1:
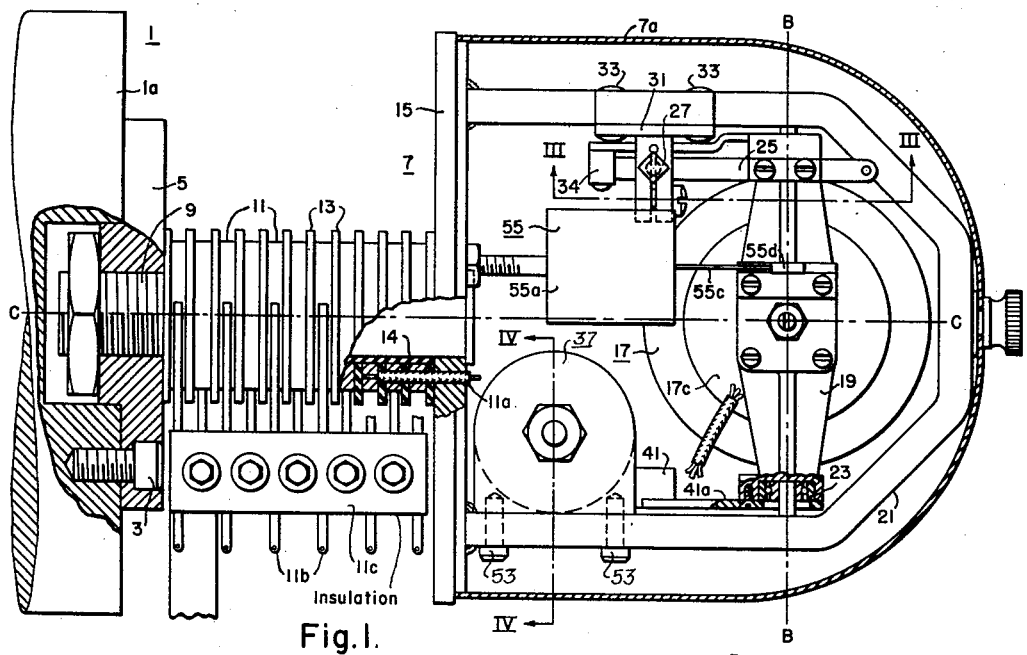

Referring to the drawings, Fig. 1 shows a motor 1 which is represented by a portion of its shaft 1a. The end of the shaft 1a has secured thereto by cap screws 3 a plate 5 to which a gyroscopic unit 7 is secured by means of a bolt 9.

Since the gyroscopic unit 7 rotates with the motor shaft and since it requires connections to external electrical circuits, a plurality of conductive slip rings 11 are positioned about the bolt 9. These slip rings are insulated from each other by means of insulating discs 13 which may be constructed of mica or other suitable insulating material. Conveniently, the slip rings may be insulated from the bolt 9 by means of an insulating sleeve 14. The gyroscopic unit 7 also includes a bed plate 15 which, together with the slip rings, is secured to the plate by means of the bolt 9.

The gyroscopic unit comprises a gyro wheel 17 which is mounted for rotation about an axis AA (Fig. 2) in any suitable manner. The axis AA commonly is referred to as the "spin" axis of the gyro wheel. In the specific embodiment herein illustrated, the gyro wheel 17 is of cup formation having a cylindrical rim 17a and an end wall 17b and is constructed of a magnetic material such as steel. A polyphase electrical winding 17c is nested within the cup-shaped gyro wheel for the purpose of producing a rotating field therein when suitably energized. This rotating fields acts to rotate the gyro wheel about the desired spin axis. If the gyro wheel is constructed of a magnetically-hard steel it will rotate in synchronism with the rotating field produced by the polyphase winding. Hysteresis motors of the foregoing type are well known in the prior art.

The gyro wheel is secured on a shaft 17d which is mounted for rotation in a cradle 19. It will be understood that the polyphase winding 17c is secured rigidly in any suitable manner to the cradle 19.

The cradle 19 in turn is mounted for rotation about an axis BB relative to a U-shaped bracket 21 by means of suitable bearings 23. The axis BB commonly is referred to as a "precession" axis. As hereinafter pointed out with greater particularity, the rotation of the cradle 19 about the precession axis BB may be confined to a small arc.

Figure 2:
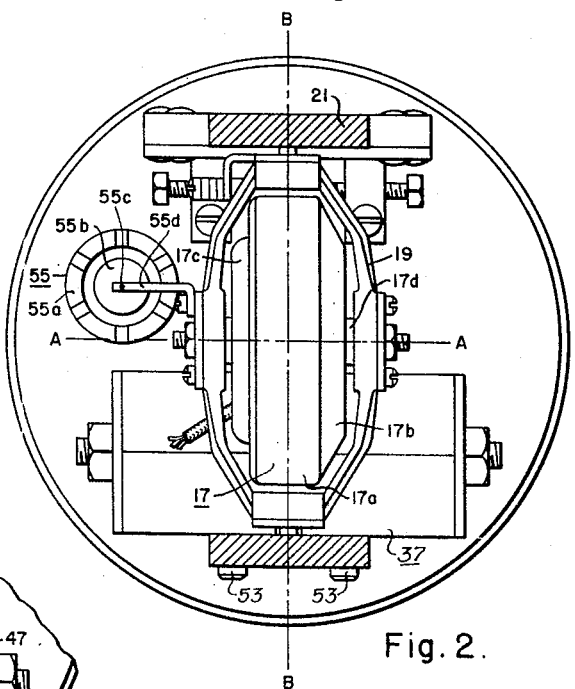
Fig. 2 is a view in end elevation with parts removed and parts broken away of the gyroscopic unit illustrated in Fig. 1.

Referring more particularly to Fig. 1, it will be observed that the U-shaped bracket 21 has its ends attached in any suitable manner, such as by welding, to the bed plate 15. This mounts the gyroscopic unit for rotation with the motor shaft 1a about the axis CC of the motor shaft. In the terminology of the gyroscopic art the axis CC is referred to as the "torque" axis. In the embodiment of Figs. 1 and 2 the axes AA, BB and CC all intersect at a common point. The torque and spin axes are perpendicular to the precession axis. Although a small movement about the precession axis is permitted, preferably the spin axis is maintained substantially normal to the torque axis.

Figure 3:
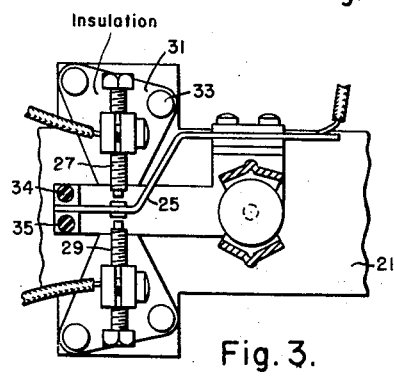
Fig. 3 is a detail view in bottom plan of a contact assembly employed in the gyroscopic unit taken along the line III—III of Fig. 1.

Precession of the gyroscope is employed for moving a movable contact 25 into engagement with either of two spaced fixed contacts 27 and 29 (Fig. 3). The fixed contacts 27 and 29 are adjustably secured to a plate 31 of insulating material which in turn is attached to the bracket 21 in any suitable manner as by means of rivets 33. Stops 34 and 35 may be constructed of insulating material and may be positioned to limit the movement of the movable contact 25 about the precession axis.

As previously pointed out electrical connections to the gyroscopic unit are completed through the slip rings 11. To this end, each of the slip rings may be connected to apparatus within the cover 7a of the gyroscopic unit through a suitable conductor 11a. It will be understood that three conductors and three slip rings are provided for the polyphase winding 17c. One conductor and one slip ring are provided for each of the contacts 25, 27 and 29. Brushes 11b are associated with the slip rings in a conventional manner. For example, the brushes 11b may be secured to a stationary insulating plate 11c which may be secured to the stator of the motor 1. Each of the brushes may be connected as desired to an external circuit.

Precession of the gyroscope is adjustably restrained by means of a solenoid assembly 37. The restraint is introduced through an armature 39 (Fig. 4) in the form of a ring of soft magnetic material which is secured to a vane 41. The vane 41 is secured to the cradle 19 through an arm 41a (Fig. 1).

Figure 4:
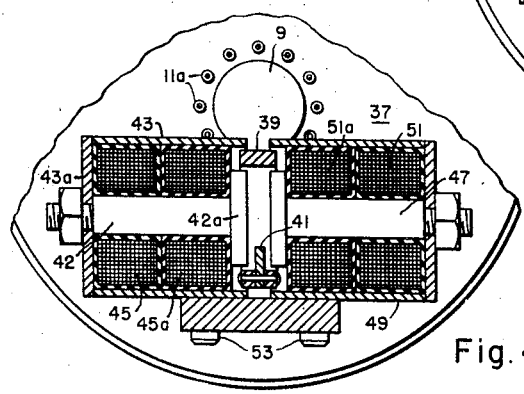
Fig. 4 is a detail view in section of a solenoid assembly employed in the gyroscopic unit taken on the line IV—IV of Fig. 1.

Solenoid coils are provided for biasing the armature 39 in a desired direction about the axis of precession of the gyroscope. As shown in Fig. 4, a soft magnetic core in the form of a bolt 42 is secured within a cup 43 of soft magnetic material. The bolt conveniently may be secured to the end wall 43a of the cup. It will be observed that the head 42a of the bolt 42 is spaced from the rim of the cup 43 to provide an annular air gap for receiving one edge of the armature 39. The bolt 42 or magnetic core is surrounded by windings 45 and 45a which when energized establish a magnetic field which tends to move the armature 39 towards the left as viewed in Fig. 4. In a similar manner a magnetic core 47 in the form of a bolt, a magnetic cup 49 and windings 51 and 51a are associated with the right-hand edge (as viewed in Fig. 4) of the armature 39. When the coils 51 and 51a are energized the resulting magnetic field attracts the armature 39 toward the right as viewed in Fig. 4. Consequently, by suitable energization of the coils 45, 45a, 51 and 51a the restraint offered to precession of the gyroscope may be adjusted as desired. Connections to the various coils 45, 45a, 51 and 51a may be effected through the slip rings in the manner hereinbefore described for other electrical components. Conveniently, the cups 43 and 49 may be secured to the bracket 21 in any suitable manner as by means of cap screws 53.

From the foregoing discussion, it will be understood that the gyroscopic unit is rotated in its entirety about the torque axis CC in accordance with rotation of the motor shaft 1a. If the gyro wheel is rotating about its spin axis it follows that the gyroscope develops a force of precession which is proportional to the rate of rotation of the motor shaft 1a. If the force of precession is greater than the opposing resultant force developed by the coils 45, 45a, 51 and 51a, the movable contact 25 is actuated into engagement with one of the fixed contacts. Conversely, if the force of precession is less than the resulting force developed by the coils, the movable contact 25 is actuated into engagement with the other of the fixed contacts.

In some cases it may be desirable to damp rotation of the cradle 19 about the precession axis BB. Such damping may be provided by means of an air dashpot 55 which has a dashpot cup 55a secured to the bed plate 15. The piston 55b (Fig. 2) of the dashpot is secured through a resilient wire 55c to a bracket 55d. The bracket in turn is secured to the cradle 19. Since the operation of dashpots is well known in the art, further discussion thereof is believed to be unnecessary. Various parts of the gyroscopic unit may be protected by a cover 7a which is detachably secured to the bed plate 15 in any suitable manner.

Systems requiring the gyroscopic unit 7 heretofore described now will be discussed. In Fig. 5 the motor 1 and the gyroscopic unit 7 are again illustrated. For convenience in showing circuit connections the unit 7 is spaced from the motor, and the mechanical connection therebetween is illustrated by a dotted line. The motor 1 has a field winding 1f which is connected for energization from a source of direct current represented by conductors L1 and L2. These conductors may be energized from a shunt-connected direct-current generator 59. The shunt generator has a shunt field 59f which is energized through an adjustable resistor 59r. A conventional voltage regulator 59v is provided for controlling the energization of the field winding 59f to maintain a constant voltage across the conductors L1, L2. In the specific embodiment of Fig. 5 the voltage regulator adjusts the effective resistance value of the resistor 59r to maintain the desired constant voltage.

The motor 1 of Fig. 5 is connected in a variable-voltage system which includes a direct-current generator 61. The generator 61 has an armature 61A which is connected in a loop circuit with the armature 1A of the motor 1 by means of conductors 63 and 63a. A generator field winding 61f is connected for energization from the armature 65A of an exciter generator 65.

The exciter armature 65A and the generator armature 61A are mounted on a common shaft represented by a dotted line 67 for rotation at a uniform rate by means of a conventional motor (not shown). The exciter generator 65 has a sustaining series field winding 65f which is connected in series with the field winding 61f and the armature 65A.

The exciter generator also has two auxiliary field windings 69 and 69a for controlling or regulating the resultant field energization of the exciter generator. Each of these auxiliary field windings has a terminal connected through a conductor 71 to the conductor L2. The remaining terminal of the auxiliary field winding 69 is connected to the fixed contact 27 of the gyroscopic unit 7. The remaining terminal of the auxiliary field winding 69a is connected to the fixed contact 29 of the gyroscopic unit 7. The movable contact 25 of the gyroscopic unit is connected through a conductor 73 to the conductor L1.

When one of the windings, such as the auxiliary winding 69, is energized through the conductors 73 and 71, the resulting energization of the series winding 65f is in a direction to aid the field excitation produced by the auxiliary winding 69. When the other auxiliary winding 69a is thereafter connected for energization, the field excitation thereof is in opposition to that produced by the sustaining field winding 65f.

The coils 45 and 51 of the gyroscopic unit are connected for energization from the conductors L1 and L2. The coils 45 and 51 are connected for energization through a circuit which may be traced from the conductor L1 through a resistor 75, a conductor 77, the coil 51, the coil 45 and a conductor 79 to the conductor L2. The relative energizations of the two coils 45 and 51 is controlled by means of a resistor 81 which is connected between the conductor 79 and a terminal common to the resistor 75 and the conductor 77. A terminal common to the coils 45 and 51 is connected through a winding 83 to an adjustable tap 81a on the resistor 81. When the tap 81a is in its highest position the coil 51 receives a minimum energization from the associated conductors L1, L2. When the tap 81a is in its lowest position as viewed in Fig. 5, the coil 45 receives its minimum energization from the conductors L1 and L2. By adjusting the tap 81a to intermediate positions on the resistor 81, the relative energizations of the coils 45 and 51 may be adjusted as desired for the purpose of adjusting the resultant force acting on the armature 39. It will be recalled that this resultant force may be employed for opposing precession of the gyroscopic unit 7. The coils 45a and 51a of Fig. 4 are not employed in the embodiment of Fig. 5.

In order to improve the stability of the system, it is desirable to control the gyroscopic unit further in accordance with acceleration of the motor 1. This may be effected by mounting a flywheel loosely on the shaft 1a and biasing the flywheel by means of springs towards a predetermined position with respect to the shaft 1a. When the acceleration of the motor 1 is changed, the resultant movement of the flywheel with respect to the shaft 1a may be employed for closing a pair of contacts to modify the energizations of the coils 45 and 51.

For slow-speed motors such as those employed in gearless elevator systems, the flywheel may require undesirably great mass for effective operation. For this reason a preferred construction for obtaining the desired response to acceleration of the motor is illustrated in Fig. 5.

In Fig. 5 the winding 83 constitutes the secondary winding of a transformer which has a primary winding 83a. This primary winding is suitably connected for energization from the loop circuit connecting the generator 61 and the motor 1. Conveniently, the primary winding may be connected across the motor armature through an adjustable resistor 85.

As long as the motor 1 is operating at a constant rate of rotation, the direct voltage thereacross is constant and no voltage is induced in the secondary winding 83. However, if the voltage output of the generator 61 is increased or decreased for the purpose of changing the rate of rotation of the motor 1 the counterelectromotive force of the motor 1 will change to a new value. During this period of change a voltage is induced in the secondary winding 83 which modifies the energizations of the coils 45 and 51. Depending on the polarity of the connections of the secondary winding 83 to the coils 45 and 51, the output of the secondary winding may be employed either as a positive feedback or a negative feedback for the purpose of modifying the force acting on the armature 39. In the preferred embodiment of the invention the output of the transformer secondary winding 83 is employed as a negative feedback for the purpose of opposing the resultant force acting on the armature 39 as a result of the current supplied to the coils 45 and 51 from the conductors L1 and L2.

Although the transformer may require a large magnetic core to prevent saturation of the core for accelerations of the type encountered in elevator systems, it is completely stationary equipment. For this reason it is preferred to the previously-mentioned flywheel alternative.

For the purpose of discussing the operation of the system illustrated in Fig. 5, it will be assumed initially that the motor 1 is at rest. The generator 59 is started to energize the conductors L1, L2 and the tap 81a is adjusted to provide the desired motor speed. Although the tap 81a may be adjusted manually as desired, in practice the tap may be adjusted automatically in accordance with a desired pattern. An automatic control of the energization of the coils 45 and 51 will be discussed below in connection with Fig. 6. It will be understood further that the polyphase winding 17c is suitably energized from a polyphase source for the purpose of rotating the gyro wheel about its spin axis.

Since the gyroscopic unit is stationary with respect to its torque axis, no force of precession acts on the armature 39. Consequently, the resultant force produced by the energization of coils 45 and 51 moves the cradle 19 about the precession axis to effect engagement between the movable contact 25 and one of the fixed contacts. It will be assumed that the movable contact under these conditions engages the fixed contact 27 to energize the auxiliary field winding 69. The auxiliary field winding excites the exciter generator 65 and this generator in turn excites its sustaining field winding 65f and the field winding 61f of the generator 61. The voltage output of the generator 61 is applied to the armature of the motor 1 and this motor consequently accelerates.

As the motor 1 accelerates two additional forces are applied to the cradle 19 of the gyroscopic unit. One of these forces is the precession force which increases as the rate of rotation of the motor 1 increases. The second force is that supplied through the feedback transformer. As the motor 1 accelerates the counterelectromotive force thereof increases. During the period of acceleration a changing current flows through the primary winding 83a of the feedback transformer to induce a voltage in the secondary winding 83. The voltage output of the secondary winding 83 acts on the coils 45 and 51 to produce a force on the cradle 19 which acts in the same direction as the precession force of the gyroscopic unit. The force produced by the secondary voltage decreases as the counterelectromotive force of the motor 1 approaches the voltage output of the generator 61.

When the motor 1 reaches its desired rate of rotation the precession force acting on the cradle 19 becomes sufficient to move the movable contact 25 away from the fixed contact 27 against the bias produced by the armature 39. The sustaining field winding 65f may be proportioned to supply sufficient excitation for a major portion of the load on the motor 1.

Should the motor 1 accelerate to a rate of rotation higher than that desired, the force of precession becomes sufficient to move the movable contact 25 into engagement with the fixed contact 29. The ensuing energization of the winding 69a reduces the resultant excitation of the exciter generator 65. Since the voltage output of the generator 61 now decreases, the motor 1 begins to slow down to the desired rate of rotation. During this slowdown the feedback transformer induces a voltage in the secondary winding 83 which is properly polarized to stabilize the operation of the system.

From consideration of the foregoing operation of the system illustrated in Fig. 5, it follows that the movable contact 25 oscillates between the fixed contacts 27 and 29 to maintain a desired rate of rotation of the motor 1. The sensitivity of the system may be decreased by maintaining the movable contact 25 in a constantly vibrating condition. This vibrating condition may be produced by a slight unbalance in the gyro wheel 17. The unbalance is represented in Fig. 5 by the reference character 17e which may designate a small weight attached to the rim of the gyro wheel 17 or a small hole drilled in the aforesaid rim. Because of the unbalance, the movable contact 25 vibrates at a substantial rate about the axis of precession of the gyroscopic unit. The maximum amplitude of vibration is less than the travel of the movable contact between the fixed contacts.

In approaching one of the fixed contacts the vibrating movable contact 25 first engages the fixed contact only at the peak positions of its vibration. Consequently, a minimum duration of contact between the movable and associated fixed contact is obtained. As the movable contact continues to approach the fixed contact the period of engagement during each cycle of the vibration increases until a maximum is reached wherein the movable contact is held constantly in engagement with the associated fixed contact.

In this way a proportional control of the speed of the motor 1 is obtained. The rate of rotation of the motor 1 may be maintained at a desired value with an error of less than 1% of the rated full rate of rotation of the motor under variations of load which are normally encountered. It has been possible to maintain substantially a linear relation between the resultant force acting about the precession axis of the gyroscopic unit and the current output thereof virtually down to zero rotation of the motor 1. Furthermore, it is possible to obtain highly damped performance of the system with substantially no hunting of the motor 1. When a change in the rate of rotation of the motor is desired the change is effected smoothly with substantially no shock or undesirable disturbance to the load on the motor 1. The system is particularly suitable for elevator installations for the reason that maximum comfort for the passengers is assured and the accurate control of the elevator speed during landing conditions assures efficient landing and minimum loss of time in stopping to discharge and pick up passengers.

The rapid response of the system is also desirable for installations wherein a load acts to move the motor 1 in an undesired direction. For example, in a leveling type of elevator system let it be assumed that an elevator car comes to rest at a position below the desired landing. When the elevator brake is released during the sequence of operation required to level the elevator car, the elevator car may drop before the elevator motor is energized sufficiently to support the load therein. In order to avoid such drops, motion indicators and other auxiliary apparatus have been employed in elevator systems. With the gyroscopic regulator here described, the response of the system may be made so rapid that motion indicators and other auxiliary apparatus required to counteract the effects of time lag in prior art motor control systems may be eliminated.

Since the invention is particularly suitable for an elevator system, such a system is illustrated in Fig. 6. In Fig. 6 the gyroscopic unit 7, the motor 1, the generator 61, the exciter generator 65 and the feedback transformer comprising the windings 83 and 83a of Fig. 5 again are employed. In Fig. 6 the coils of various relays and switches and contacts controlling the energizations of the coils are shown connected in straight lines between the conductors L1 and L2. The association between each coil of a relay and switch, and the contacts actuated thereby, is illustrated in the key Figure 6A. The contacts and coils of Fig. 6A are substantially in a horizontal alignment with the corresponding parts of Fig. 6. All relays and switches are illustrated in their deenergized positions.

In order to simplify the consideration of Figs. 6 and 6A, the following designations of switches and relays will be employed:

UR—up-direction relay
DR—down-direction relay
U—up-direction switch
D—down-direction switch
M—car running relay
V—speed relay
Y—auxiliary speed relay
E—slowdown inductor relay
F—auxiliary slowdown inductor relay The above reference characters are applied to the coils of the switches and relays. The associated contacts are identified by the same reference characters followed by suitable identifying numbers.

The elevator system of Fig. 6 is of the car-switch-operated type. A car switch 89 is provided which has an up contact 89u, a down contact 89d and a stop contact 89s. When the car switch 89 is operated by the elevator car operator to engage the up contact 89u, an energizing circuit is established for the up-direction relay UR which may be traced from the conductor L1 through the car switch 89, the coil of the up-direction relay UR and the door contacts 91 to the conductor L2. It will be understood that the door contacts 91 are of conventional construction and that one is provided for each landing door served by the elevator car. Each contact is closed only when its associated door is in closed position.

When the coil of the up-direction relay UR is energized, contacts UR1, UR2 and UR4 are closed by such energization and contacts UR3 are opened. Contacts UR4 are closed to energize an up-direction switch U, and a car running relay M. This energizing circuit may be traced from the conductor L1 through the contacts UR4, the up-direction switch U, the back contacts DR4 of a down-direction relay and the car running relay M to the conductor L2.

The car running relay M when energized closes its contacts M1, M2 and M3. The contacts M1 in closing energizes the brake release coil of an elevator brake 93 to release the brake. The brake 93 is spring-biased against a brake drum 93a which is mounted on the motor shaft 1a. It will be understood that the motor shaft 1a also carries a traction sheave 95 for operating an elevator car EC in a conventional manner.

Closure of the contacts M2 of the car running relay connects the armature of the exciter generator 65 in series with the field winding 65f and the field winding 61f.

Closure of the contacts M3 prepares the slowdown inductor relay E and the auxiliary slowdown inductor relay F for energization, but the energizing circuit is not completed at this time for the reason that the contact 89s is not engaged by the car switch 89.

Energization of the coil of the up-direction switch U results in closure of the contacts U1 to U5. The contacts U1 and U2 connect the coils 45 and 51 of the gyroscopic unit in series with the winding 83 and the resistors 97 and 97a across the conductors L1 and L2. The polarity of energization of the coils 45 and 51 as a result of the closure of the contacts U1 and U2 is suitable for up-direction travel of the elevator car. However, the operation of these coils is somewhat different from that discussed with reference to Fig. 5.

Referring to Fig. 4 it will be observed that the coils 45a and 51a also operate on the armature 39. These coils in the system of Fig. 6 are connected to exercise a constant bias on the armature 39. The coils 45a and 51a are connected in series across the conductors L1 and L2. A resistor 99 may be connected across the two coils 45a and 51a and may have an adjustable center tap connected to the terminal common to the two coils. By manipulation of the adjustable tap the distribution of current between the two coils 45a and 51a may be varied to the desired distribution.

The coils 45a and 51a are energized to apply a constant bias to the armature 39 (Fig. 4). When the coils 45 and 51 are energized in series in one direction, the polarities are so selected that the magnetomotive forces of the coils 45 and 45a act in the same direction on the armature 39, whereas the magnetomotive forces of the coils 51 and 51a act in opposition to each other on the armature 39. Under these circumstances the armature 39 in Fig. 4 has a resultant force moving it towards the left. When the polarity of the energizations of the coils 45 and 51 in series is reversed the magnetomotive forces of the coils 51 and 51a become additive and the magnetomotive forces of the coils 45 and 45a are in opposition. Consequently, the armature 39 in Fig. 4 then has a resultant force applied to it which moves the armature towards the right. It follows that the polarity of the energizations of the coils 45 and 51 in Fig. 6 determines which of the contacts 27 or 29 is engaged by the movable contact 25.

It will be assumed that when the contacts U1 and U2 close the polarity of energization of the coils 45 and 51 is such that the movable contact 25 engages the fixed contact 27 and energizes the field winding 69 in a proper direction for up travel of the elevator car. When the polarity of the energization of the coils 45 and 51 is reversed by closure of the contacts D1 and D2 of a down-direction switch, the movable contact 25 engages the fixed contact 29 to energize the field winding 69a in proper direction for down travel of the elevator car. It will be understood in Fig. 6 that the gyroscopic unit 7 is associated with the shaft 1a in the manner discussed with reference to Fig. 1. However, the components of the gyroscopic unit are displaced from the shaft for convenience in showing the connections thereof. The various components are connected in Fig. 6 by dotted lines.

Closure of the contacts UR1 of the up-direction relay completes a circuit for the speed relay V. This circuit may be traced from the conductor L1 through the contacts UR1, normally closed contacts of a top limit switch 101, contacts E1 of a slowdown inductor relay, the coil of the speed relay V and the door contacts 91 to the conductor L2. The top limit switch 101 is of conventional construction. It is intended to be opened as the elevator car approaches its upper limiting position to deenergize the speed relay V.

When energized the speed relay V closes its contacts V1 to shunt the resistor 97 and opens its contacts V3 to prevent energization of the auxiliary slowdown inductor relay F. Also contacts V2 close to establish with the contacts U3 of the up-direction switch a holding circuit around the contacts UR1.

The contacts UR2, in closing, establish an energizing circuit for the auxiliary speed relay Y which may be traced from the conductor L1 through the contacts UR2, top limit switch 103, contacts F1 of the auxiliary slowdown inductor relay, the coil of the auxiliary speed relay Y and the door contacts to the conductor L2. The top limit switch 103 is similar to the switch 101 but is opened by the elevator car as it approaches its top limiting position to deenergize the auxiliary speed relay Y.

When energized, the auxiliary speed relay Y closes its contacts Y1 to shunt the resistor 97a and closes its contacts Y3 to energize the coil of a leveling switch L and through a resistor RL the coil of a holding relay LT. The leveling switch will be discussed below. Also contacts Y2 close to establish with the contacts U4 of the up-direction switch a holding circuit around the contacts UR2.

Opening of the contacts UR3 prevents energization of the down-direction switch D. Closure of the contacts U5 establishes with contacts LT1 of the holding relay a holding circuit around the contacts UR4.

Let it be assumed next that the car switch 89 is rotated to engage the down-direction contact 89d. Such rotation establishes an energizing circuit for the down-direction relay DR through the door contacts 91. Energization of the coil of the down-direction relay DR closes contacts DR1, DR2 and DR3 and opens contacts DR4.

In closing, the contacts DR3 establish an energizing circuit which may be traced from the conductor L1 through the contacts DR3, the coil of the down-direction switch D, back contacts UR3 and the coil of the car running relay M to the conductor L2.

The car running relay M, when energized, operates in the manner heretofore described.

The coil of the down-direction switch D, when energized closes its contacts D1 to D5. Closure of the contacts D1 and D2 establishes an energizing circuit for the coils 45 and 51 with proper polarity for down-direction travel of the elevator car.

The contacts DR1, in closing, establish an energizing circuit for the speed relay V. The operation of this energizing circuit and the operation of the speed relay V will be understood from the previous discussion of the operation resulting from closure of the contacts UR1. It will be noted, however, that the circuit completed by closure of the contacts DR1 includes a bottom limit switch 101a in place of the top limit switch 101 and inductor relay contacts E2 in place of the contacts E1. The bottom limit switch 101a opens as the elevator car approaches its bottom limiting position. The contacts V2 now cooperate with the contacts D3 to establish a holding circuit around the contacts DR1.

Closure of the contacts DR2 completes an energizing circuit for the auxiliary speed relay Y. This energizing circuit and the operation of the auxiliary speed relay Y will be understood from the discussion of the effects of closure of the contacts UR2. It will be noted that the energizing circuit completed by the closure of the contacts DR2 includes a bottom limit switch 103a in place of the top limit switch 103 and inductor relay contacts F2 in place of the contacts F1. The bottom limit switch opens as the elevator car approaches its bottom limiting position. The contacts Y2 now cooperate with the contacts D4 to establish a holding circuit around the contacts DR2.

Opening of the contacts DR4 prevents energization of the up-direction switch U. The contacts LT1 of the holding relay now cooperate with the contacts D5 to establish a holding circuit around the contacts DR3.

The elevator system of Fig. 6 includes a leveling arrangement which may be similar to any conventional leveling system. For the purpose of illustration a simple leveling arrangement is illustrated in Fig. 6. This includes a cam-operated up-leveling switch UL and a down-leveling switch DL which are connected to by-pass, respectively, the contacts UR4 and DR3. The effect of closure of the switches UL and DL will be understood from the discussion of the effects of closure of the contacts UR4 and DR3.

The switches UL and DL are operated by spaced cams 105 and 105a which are located at each of the landings served by the elevator car. The switches UL and DL are mounted on the elevator car. During full-speed travel of the elevator car they are retracted by energization of the leveling coil L to a position wherein they cannot be operated by the cams 105 and 105a. When energized, the leveling coil L operates on a magnetic armature against a spring bias to retract the switches UL and DL to ineffective positions.

If the elevator car is accurately registered with a landing, the switches UL and DL occupy the positions illustrated in Fig. 6 and both of the switches are open. If the elevator car drops because of stretching of the cable or if it overtravels a landing at which it is to stop during down travel, the switch UL is actuated by its cam 105a to complete an energizing circuit for the up-direction switch U. Since the result of closure of the contacts UL is similar to that of closure of the contacts UR4, a further discussion thereof at this point is not required. As the elevator car moves to its required position at its landing, the switch UL rides off its associated cam 105a and the switch reopens to bring the elevator car to a stop. In a similar manner the switch DL operates for overtravel of the elevator car with respect to a desired landing in an up-direction to energize the down-direction switch D for the purpose of restoring the elevator car to its desired registration with the associated landing.

The switches UL and DL need not engage their associated cams during travel of the elevator car. The retraction of the switches is effected by energization of the leveling coil L in response to closure of the contacts Y3.

The coil L is maintained energized through the contacts LR1 of a leveling relay until the car is adjacent the desired landing. The leveling relay LR is connected for energization through a resistor 109 across the terminals of the armature of the motor 1. Consequently, the leveling relay is energized substantially in accordance with the counterelectromotive force of the motor. This means that the contacts LR1 remain closed until the armature of the motor 1 has slowed and the elevator car is adjacent a landing at which it is to be stopped. Consequently, the switches UL and DL are not projected into operative position with respect to the associated cams until the elevator car is adjacent a landing at which it is to be stopped. As a specific example for a high speed elevator car in a gearless system (which may operate at a full speed above say 800 feet per minute), the relay LR may drop out at a speed of the elevator car of the order of 60 to 100 feet per minute.

The relationship of the elevator car and the various components mounted in the hoistway is illustrated in Fig. 7. The inductor plates EP are located adjacent the path of travel of the inductor relay E which is mounted on the elevator car. These plates are positioned to actuate the inductor relay a suitable distance from a landing at which the elevator car is to stop for the purpose of initiating a slowdown of the elevator car. One of the inductor plates is located adjacent each landing for down travel of the elevator car and one plate is positioned adjacent each landing to care for up travel of the elevator car. The inductor plates for up travel and the inductor plates for down travel are located on opposite sides of the path of travel of the car-mounted inductor relay E for actuating respectively the contacts E1 and E2. Such arrangements of the plates and relay are well known.

In a similar manner "up" and "down" inductor plates FP are mounted in the hoistway adjacent the path of travel of the inductor relay F which is also mounted on the elevator car. These inductor plates are positioned to actuate respectively the contacts F1 and F2 and initiate a further slow down of the elevator car as it approaches a landing at which it is to stop. Such inductor plates and inductor relays are well known in the art.

The operation of the system illustrated in Fig. 6 will be discussed first with reference to starting of the elevator car in an up direction from one of the lower floors served by the elevator car. The elevator attendant first closes the landing door in order to make certain that all of the door contacts 91 are closed. He then rotates the car switch 89 in a direction to engage the contact 89u. Such rotation of the car switch completes an energizing circuit for the up-direction relay UR. The energized up-direction relay UR closes its contacts UR4 to establish an energizing circuit for the up-direction switch U and the car running relay M.

The up-direction switch U closes its contacts U1 and U2 to connect the coils 45 and 51 for up travel of the elevator car. These coils, when energized, actuate the contacts 25 and 27 into engagement for the purpose of connecting the field winding 69 for energization.

The car running relay closes its contacts M1 to release the elevator brake 93 and closes its contacts M2 to complete an energizing circuit for the field windings 65f and 61f. The field winding 61f now is energized in proper direction for up travel of the elevator car and the motor 1 begins to accelerate. It will be understood that a substantial portion of the field excitation for the exciter generator 65 is supplied by the self-sustaining series field winding 65f.

Inasmuch as the contacts UR1 and UR2 are closed to energize the speed relays V and Y, the resistors 97 and 97a are shunted and the coils 45 and 51 have maximum energization. Because of the maximum energization of the coils 45 and 51, maximum resultant force is applied to the cradle 19 (Fig. 1) of the gyroscopic unit to oppose precession thereof and the elevator car rapidly accelerates to its maximum running speed.

As previously explained, the acceleration of the elevator car is effected with extreme uniformity and rapidity with virtually no overshoot or hunting.

Inasmuch as the contacts UR3 are now open, the down-direction switch D cannot be energized to affect the operation of the elevator system.

During the entire operation of the elevator system, the polyphase winding 17c is connected to a suitable source of polyphase energy to maintain continuous rotation of the gyro wheel 17 at a suitable uniform rate such as 1800 revolutions per minute.

The contacts V2 close to establish with the contacts U3 a holding circuit around the contacts UR1 through which the speed relay V is energized. Similarly, the contacts Y2 close to establish with the contacts U4 a holding circuit around the contacts UR2.

The contacts V3 open, but have no immediate effect on the system operation.

It will be recalled that the energization of the auxiliary speed relay Y results in closure of the contacts Y3 to energize the leveling coil L and the holding relay LT. When energized, the leveling coil retracts the switches UL and DL from association with the cams 105 and 105a. As the counterelectromotive force of the motor 1 increases, the leveling relay LR is energized to close its contacts LR1 which shunt the contacts Y3. The contacts LT1 and U5 establish a holding circuit around the contacts UR4.

Let it be assumed that the car is to be brought to a stop at a landing which it is approaching. The elevator attendant rotates the switch 89 into engagement with the stop contact 89s. The up-direction relay is deenergized by such movement of the car switch but the resulting opening of the contacts UR4 has no immediate effect on the operation of the elevator system for the reason that the contacts UR4 are by-passed by the contacts LT1 and U5.

Opening of the contacts UR1 and UR2 has no immediate effect because these contacts have by-passes therearound. Closure of the contacts UR3 conditions the down-direction switch D for subsequent operation.

When the car switch 89 engages the stop contact 89s, an energizing circuit is completed for the coil of the inductor relay E. This circuit may be traced from the conductor L1 through the car switch, the coil E and the contacts M3 to the conductor L2. The energization of the coil of the inductor relay E has no immediate effect on the system. It will be recalled that energization of an inductor relay is ineffective until the inductor relay is adjacent one of its associated inductor plates.

When the inductor relay E reaches the next associated inductor plate EP, the inductor relay operates to open its contacts E1. Such opening deenergizes the speed relay V which opens its contacts V1. The opening of the contacts reinserts the resistor 97 in series with the coils 45 and 51. As a result the force opposing precession of the gyroscopic unit decreases and the movable contact 25 moves towards engagement with the contact 29. The ensuing decrease in field excitation of the exciter generator 65 results in a decrease in the field excitation of the generator 61 and the motor 1 starts to decelerate. Such deceleration is accompanied by a voltage induced in the secondary winding 83 in the manner discussed with reference to Fig. 5. In Fig. 6 the primary winding 83a is shown connected across an adjustable portion of a voltage divider 85a which is connected across the terminals of the motor 1. The motor 1 rapidly decelerates to a new speed determined by the reduced resultant bias opposing precession of the gyroscopic unit and accurately maintains the speed determined by such bias.

The deenergization of the speed relay V also results in closure of the back contacts V3 which connects the auxiliary inductor relay F across the conductors L1 and L2 for energization therefrom. The energization of the coil of the inductor relay F does not result in immediate operation thereof. However, when the inductor relay F reaches an associated inductor plate FP a predetermined distance in advance of the landing at which the elevator car is to stop the inductor relay operates to open its contacts F1. This results in the deenergization of the auxiliary speed relay Y and the contacts Y1 open to reinsert the resistor 97a in series with the coils 45 and 51.

The additional resistance introduced by the resistor 97a results in a still further decrease in the energization of the coils 45 and 51. The decrease in the force opposing precession of the gyroscopic unit forces the movable contact 25 towards the fixed contact 29 and the motor 1 decelerates to a still lower landing speed. The additional deceleration is effected rapidly and the gyroscopic unit maintains the motor 1 accurately at the desired low landing speed.

The deenergization of the coil of the auxiliary speed relay Y also results in opening of the contacts Y3. However, such opening has no immediate effect on the coil L for the reason that the contacts LR1 remain closed.

When the elevator car slows below a predetermined speed (such as 60 to 100 feet per minute for a high-speed elevator car) the leveling relay LR drops out to open its contacts LR1. The resulting deenergization of leveling coil L allows a spring bias to project the switches UL and DL into positions wherein they can be operated by the associated cams 105 and 105a. The cam 105a may have sufficient length to engage the switch UL when the leveling coil L is deenergized. The switch UL thereupon closes to by-pass the circuit comprising the contacts LT1 and U5.

The holding relay LT drops out with a slight delay represented by a delay resistor LTR. Because of the prior closing of the switch UL, the opening of the contacts LT1 does not deenergize the down-direction switch U.

As the elevator car nears the desired landing, the switch UL rides off the cam 105a to deenergize the up-direction switch U and the car running brake release M opens its contacts M1 to deenergize the relay coil and apply the elevator brake. The contacts M2 open to deenergize the field windings 65f and 61f. Field discharge resistors may be connected across the field windings 61f and 65f if desired but such resistors are not shown in Fig. 6. Since the elevator motor now is deenergized and the brake 93 is applied, the elevator car stops accurately at the desired landing. The various switches, relays and contacts now are in the condition illustrated in Fig. 6.

Should the elevator car overshoot the desired landing, the switch DL engages the associated cam 105 of the desired landing and closes its contacts to energize the down-direction switch D and the car running relay M. The deenergization of the down-direction switch and the car running relay M moves the car downwardly towards the desired position in the manner heretofore described. As soon as the switch DL leaves its associated cam, it reopens to deenergize the down-direction switch D and the car running relay M to bring the car to a stop. The leveling relay LR does not pick up during the leveling operation.

Should the elevator car drop slightly because of cable stretch, the switch UL will be reclosed by its cam 105a. Such closure energizes the up-direction switch U and the car running relay M to move the car upwardly in the manner heretofore described. In this way the car is maintained accurately at the desired landing.

If it is desired to return the elevator car to a lower landing, the elevator attendant operates the car switch 89 to engage the contact 89d. It is assumed that he also has closed the landing door. As a result of the energization of the down-direction relay DR, the contacts DR3 close to energize the down-direction switch D and the car running relay M.

Energization of the down-direction switch D results in closure of the contacts D1 and D2. This connects the coils 45 and 51 with proper polarity for operation of the elevator car in the down direction. The bias produced by these coils is such that the contact 25 moves into engagement with the fixed contact 29. The resulting energization of the field winding 69a is in proper direction for down travel of the elevator car. When the contacts M1 and M2 are closed, the brake 93 is released and the field winding 61f is energized to operate the elevator car in a down direction.

Closure of contacts DR1 and DR2 energizes the speed relays V and Y. Consequently, the contacts V1 and Y1 are closed to shunt the resistors 97 and 97a. The car, therefore, accelerates to its maximum running speed in the down direction.

It will be understood that since the inductor relays are deenergized when the car comes to a stop by the opening of the contacts M3 of the car running relay, and also by the movement of the car switch from the contact 89s, the contacts E1 and F1 are closed at the time the car starts away from a landing.

The speed relay V opens its contacts V3 to prevent subsequent energization of the inductor relay F. The auxiliary speed relay closes its contacts Y3 to energize the leveling coil L and the holding relay LT. The leveling coil moves the level switches UL and DL to positions wherein they do not engage the associated cams 105 and 105a during travel of the car.

As the motor 1 accelerates, the counterelectromotive force thereof increases and energizes the leveling relay LR to close the contacts LR1. These contacts establish a holding circuit around the contacts Y3.

When the car is to be brought to a stop at the desired landing, the car switch 89 is rotated to engage the stop contact 89s. This deenergizes the the down-direction relay DR but the opening of the contacts DR3 has no immediate effect for the reason that they are by-passed by the contacts LT1 and D5. The contacts DR4 close to prepare the switch U for subsequent energization. The contacts DR1 open but are by-passed by the contacts V2 and D3. Similarly, the contacts DR2 are by-passed by the contacts Y2 and D4.

The engagement of the stop contact 39s by the car switch 39 results in energization of the inductor relay E. The energization of the inductor relay E has no effect until the inductor relay reaches its next inductor plate EP. This occurs a predetermined distance from the floor at which the car is to stop and the inductor relay promptly opens its contacts E2 to deenergize the speed relay V. The speed relay V opens its contacts V1 to insert the resistor 97 in series with the coils 45 and 51. The decrease in energization of the coils results in movement of the movable contact toward the fixed contact 27 and the car decelerates to a lower speed. Also the contacts V3 close to energize the inductor relay F.

The inductor relay F does not operate until it reaches its next inductor plate FP. When this occurs, the inductor relay opens its contacts F2 to deenergize the auxiliary speed relay Y. The opening of the contacts Y1 further decreases the energization of the coils 45 and 51 and the elevator car rapidly decelerates further to its landing speed. Also the contacts Y3 open but such opening has no immediate effect for the reason that the contacts LR1 remain closed.

As the motor 1 decelerates, the counterelectromotive force developed thereby decreases and the leveling relay LR opens its contacts LR1 to deenergize the leveling coil L. This permits projection of the leveling switches U1 and D1 into position for engaging the associated cams 105 and 105a.

The down leveling switch DL engages its cam 105 and closes to establish a holding circuit for the down-direction switch. Thereafter (due to its time delay) the holding relay LT opens its contacts LT1. When the leveling switch DL passes the end of the cam 105, it opens to deenergize the down-direction switch and the car running relay M. The car running relay M opens its contacts M1 to permit reapplication of the brake 93. The contacts M2 open to deenergize the field winding 61f. Since the motor 1 now is deenergized and the brake 93 is applied, the elevator car stops accurately at the desired landing.

If for any reason the elevator car is not accurately registered with the desired landing, the leveling switches operate in the manner previously described to level the elevator car.

The opening of the contacts M3 deenergizes the inductor relays E and F and the various coils and contacts are restored to the positions illustrated in Fig. 6.

Although the invention has been described with reference to specific embodiments thereof, numerous modifications falling within the spirit and scope of the invention are possible.

I claim as my invention:

1. In an elevator system, an elevator car, means including a motor for moving the elevator car, and means controlling the speed of the elevator car, said means comprising a gyroscope having a gyrowheel mounted for rotation about spin, precession, and torque axes, means for rotating the gyrowheel about the spin axis, means for rotating the gyrowheel about the torque axis in accordance with the speed of the elevator car, and means responsive to precession of the gyroscope for regulating the energization of the motor.

2. A system as claimed in claim 1 wherein the last-named means comprises, pattern means for opposing precession of the gyroscope in accordance with a predetermined pattern.

3. A system as claimed in claim 1 in combination with means for applying a torque to the gyroscope about the precession axis which is responsive to the rate of change of the energization of the motor.

4. A system as claimed in claim 1 wherein the last-named means includes means responsive to the position of the elevator car during its travel for establishing a predetermined pattern, and means responsive to the pattern for regulating the energization of the motor.

5. A system as claimed in claim 1 in combination with means for releveling the elevator car.

6. In an elevator system, a building structure having a plurality of floors to be served by an elevator car, an elevator car, first means mounting the elevator car for movement between said floors, a motor for moving the elevator car between the floors, a gyroscope having a gyrowheel, second means mounting the gyrowheel for rotation about spin, precession and torque axes, third means for rotating the gyrowheel about the spin axis, fourth means for rotating the gyrowheel about the torque axis in accordance with the speed of the elevator car, fifth means for opposing precession of the gyrowheel, sixth means responsive to precession of the gyrowheel for controlling the energization of the motor, and seventh means responsive to arrival of the elevator car at a predetermined distance from one of the floors at which the elevator car is to stop for varying the opposition to precession of the gyrowheel.

7. A system as claimed in claim 6 in combination with a brake for the elevator car, said seventh means being effective to control the gyroscope for decreasing the speed of the elevator car towards a landing value as it continues to approach said one of the floors, and eighth means effective to a predetermined distance from said one of the floors for applying the brake to bring the elevator car to a stop at the floor.

8. A system as claimed in claim 7 in combination with ninth means responsive to failure of an elevator car to register accurately with a floor at which the elevator car is brought to a stop for releveling the elevator car.

9. In an elevator system, an elevator car, means including a motor for moving the elevator car, and means controlling the speed of the elevator car, said means comprising a gyroscope having a gyrowheel mounted for rotation about spin, precession and torque axes, means for rotating the gyrowheel about the spin axis, means for rotating the gyrowheel about the torque axis in accordance with the speed of the elevator car, means responsive to precession of the gyroscope for regulating the energization of the motor, and feedback means responsive to a change in speed of the elevator car for controlling the precession of the gyroscope.

10. In an elevator system, an elevator car, means including a motor for moving the elevator car, and means controlling the speed of the elevator car, said means comprising a gyroscope having a gyrowheel mounted for rotation about spin, precession and torque axes, means for rotating the gyrowheel about the spin axis, means for rotating the gyrowheel about the torque axis in accordance with the speed of the elevator car, means responsive to precession of the gyroscope for regulating the energization of the motor, adjustable means for adjustably opposing precession of the gyroscope, and feedback means for opposing precession of the gyroscope as a function of the energization of the motor.

11. In an elevator system, an elevator car, means including a motor for moving the elevator car, a direct-current generator having an armature connected in a loop circuit with the armature of said motor, and means controlling the speed of the elevator car, said means comprising a gyroscope having a gyrowheel mounted for rotation about spin, precession and torque axes, means for rotating the gyrowheel about the spin axis, means for rotating the gyrowheel about the torque axis in accordance with the speed of the elevator car, means responsive to precession of the gyroscope for regulating the output of the generator, adjustable means for adjustably opposing precession of the gyroscope, and feedback means responsive to the rate of change of the generator output for modifying the opposition to precession of the gyroscope.

12. A system as claimed in claim 11 characterized in that the feedback means comprises a transformer having a primary winding connected for energization from the loop circuit and having a secondary winding connected for modifying the opposition to precession of the gyroscope.

13. A system as claimed in claim 11 wherein the feedback means comprises a transformer having a primary winding connected for energization in accordance with the voltage output of the generator and having a secondary winding connected to oppose a change in the opposition to precession resulting from operation of the adjustable means.

14. A system as claimed in claim 11 in combination with means for adjusting the magnitude of the feedback derived from the transformer.

15. A system as claimed in claim 11 in combination with means responsive to failure of the elevator car to stop in registration with a desired position to relevel the elevator car to the desired position.

16. In an elevator system, an elevator car, a structure having a plurality of spaced landings to be served by the elevator car, means mounting the elevator car for movement through a predetermined path for serving the landings, a motor for moving the elevator car, a generator, said motor and said generator having armatures connected in a loop circuit, whereby the motor is energized in accordance with the output of the generator, a source of field excitation for the generator, a gyroscope having a gyrowheel mounted for rotation about spin, torque and precession axes, means responsive to the direction of precession of the gyrowheel for increasing and decreasing the field excitation of the generator, means for rotating the gyrowheel about the spin axis, means for rotating the gyrowheel about the torque axis in accordance with the speed of the elevator car, and adjustable means for providing yieldable opposition to precession of the gyrowheel from a predetermined orientation.

17. A system as defined in claim 16 in combination with a source of sustaining field excitation for the generator.

18. A system as defined in claim 16 in combination with negative feedback means responsive to acceleration of the motor for modifying the opposition to precession of the gyrowheel.

19. In an elevator system, an elevator car, a structure having a plurality of spaced landings to be served by the elevator car, means mounting the elevator car for movement through a predetermined path for serving the landings, a direct-current motor for moving the elevator car, a direct-current generator, said motor and said generator having armatures connected in a loop circuit, whereby the motor is energized in accordance with the output of the generator, a source of field excitation for the generator, a gyroscope having a gyrowheel mounted for rotation about spin, torque and precession axes, means for rotating the gyrowheel about the spin axis, means for rotating the gyrowheel about the torque axis in accordance with the speed of the elevator car, a pair of spaced contact members, said gyroscope having a movable contact element restrained for movement between the two contact members in response to precession of the gyroscope, solenoid means for opposing precession of the gyroscope in either direction with a force adjustable in accordance with the energization of the solenoid means, a source of field excitation for the generator responsive to engagement of the movable contact element with one of the contact members to increase the field excitation and responsive to engagement of the movable contact element with the other of the contact members for decreasing the field excitation, and control means for varying the energization of the solenoid means in accordance with the position of the elevator car relative to a floor at which the elevator car is to stop.

20. A system as claimed in claim 19 in combination with feedback means for energizing the solenoid means in accordance with acceleration of the motor.

21. A system as claimed in claim 19 in combination with negative feedback means comprising a transformer having a primary winding connected for energization in accordance with the voltage output of the generator, said transformer having a secondary winding connected to supply energy to the solenoid means.

22. A system as claimed in claim 21 in combination with a source of sustaining field excitation for the generator.

23. A system as claimed in claim 21 in combination with brake means for stopping the elevator car at a desired landing, and means responsive to failure of the elevator car to register with the desired floor for releveling the elevator car.

24. A system as claimed in claim 19 wherein the movable contact element is maintained in a state of vibration.

25. A system as claimed in claim 21 wherein the movable contact element is maintained in a state of vibration in combination with means for adjusting the energization of the primary winding.

26. In a motor control system, a direct-current motor, a gyroscope having a gyrowheel mounted for rotation about spin, torque and precession axes, means for rotating the gyrowheel about the spin axis, means for rotating the gyrowheel about the torque axis in accordance with rotation of the motor, means responsive to precession of the gyroscope for varying the energization of the motor, and feedback means responsive to a change in energization of the motor for controlling the precession of the gyroscope, said feedback means comprising a transformer having a primary winding connected for energization in accordance with the energization of said motor, said transformer having a secondary winding, and means energized from the secondary winding for controlling precession of the gyroscope, whereby precession of the gyroscope is controlled in accordance with rate of change of energization of the motor.

27. In a motor control system, a direct-current motor, a direct-current generator, said motor and generator having armatures connected in a loop circuit, a gyroscope having a gyrowheel mounted for rotation about spin, torque and precession axes, means for rotating the gyrowheel about the spin axis, means for rotating the gyrowheel for rotation about the torque axis in accordance with rotation of the motor, said gyroscope having a movable element restrained for movement between two spaced positions in response to precession of the gyroscope, opposing means for opposing precession of the gyroscope in either direction with an adjustable force, a source of field excitation for the generator responsive to movement of the movable element towards one of the positions for increasing the field excitation and responsive to movement of the movable element towards the other of the positions for decreasing the field excitation, and negative feedback means for varying the adjustable force, said feedback means comprising a transformer having primary and secondary windings, connections connecting the primary winding for energization from said loop circuit, and means energized from the secondary winding for adjusting said adjustable force in accordance with the rate of change of the energization of the motor.

28. A system as claimed in claim 27 in combination with a source of sustaining field excitation for the generator.

29. A system as claimed in claim 27 in combination with means for constantly vibrating the movable element.

CLINTON R. HANNA.

No references cited.